V. W. BLANCHARD.
Mower.
No. 40,812. Patented Dec. 8, 1863.
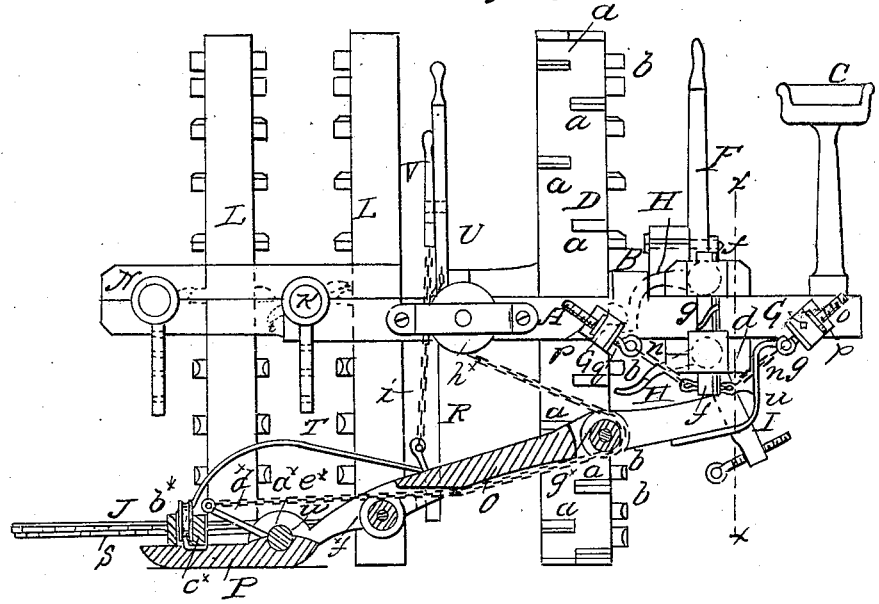
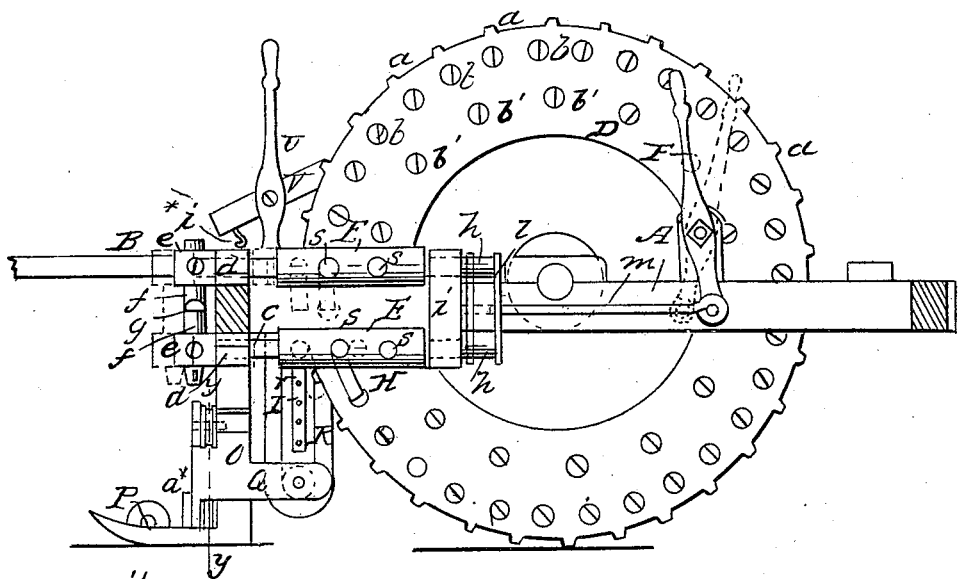
Witnesses:
Inventor
V. W. Blanchard
per Munn & Co
attorneys

UNITED STATES PATENT OFFICE.

VIRGIL W. BLANCHARD, OF BRIDPORT, VERMONT.

IMPROVEMENT IN HARVESTERS.

Specification forming part of Letters Patent No. 40,812, dated December 8, 1863.

*To all whom it may concern:*

Be it known that I, V. W. BLANCHARD, of Bridport, in the county of Addison and State of Vermont, have invented a new and Improved Grain and Grass-Harvester; and I do hereby declare that the following is a full, clear, and exact description of the same, reference being had to the accompanying drawings, making a part of this specification, in which—

Figure 1 is a front view of my invention, partly in section; Fig. 2, a side sectional view of the same, taken in the line $x\,x$, Fig. 1.

Similar letters of reference indicate corresponding parts in the two figures.

The object of this invention is to obtain a grain and grass harvester which will be of light draft, admit of having a more or less rapid movement communicated to its sickle, as occasion may require, be durable, free from all unnecessary friction in the operation of its working parts, and admit of having its finger-bar adjusted with the greatest facility, so as to clear obstructions which may lie in its path.

To enable those skilled in the art to fully understand and construct my invention, I will proceed to describe it.

A represents a rectangular frame, to the front end of which the draft-pole B is attached. C is the driver's seat; and D is a drive-wheel placed in the frame A, and having its periphery provided with cleats $a$, to prevent slipping. On one side of this drive-wheel D there are secured two concentric circles of cogs, $b\,b'$, as shown clearly in Fig. 2, the cogs $b'$ of the innermost circle being farther apart than the cogs $b$ of the outer circle.

E E represent two shafts, which are placed longitudinally in the frame A, one over the other in the same axial plane. The front ends of these shafts are provided with long journals $c$, which pass through bearings $d$ on the front of the frame A, and have each a block or head, $e$, attached to them. In each of these blocks or heads there is inserted a pin, $f$, the ends of which work in contact with each other, and are beveled, as shown at $g$ in Fig. 1. The back ends of said shafts are also provided with long journals $h$, which pass through bearings $i$, the journals $h$ being connected at their ends by a plate, $l$, which has a rod, $m$, attached to it, the outer end of said rod being connected to a lever, F, as shown clearly in Fig. 2.

The block or head $e$ of the lower shaft E has its pin $f$ projecting down below it a short distance, and has two chains, $n\,n$, attached to it, at opposite sides. The outer ends of these chains are connected to the lower ends of screw-rods $o\,o$, which pass through springs G, of india-rubber or other suitable elastic material, said rods $o$ having nuts or washers $p$ on them, which bear on the upper surfaces of the springs, the latter resting or bearing on plates $q$, attached to the frame A, as shown clearly in Fig. 1.

Each shaft E has an arm, H, projecting from it, upon which the cogs of either circle work or act. The lower shaft E has a pendent bar, I, attached to it, and this bar is perforated with a series of holes, $r$, as shown clearly in Fig. 2. The shafts E E are allowed a longitudinally-adjustable movement in consequence of their journals being allowed to slide in their bearings, and said shafts are thus adjusted by actuating the lever F. This adjusting movement is allowed the rollers in order that the arms H may be thrown out of gear with the cogs $b$ or $b'$. The shafts E E have each two holes, $s\,s$, made in them, so that the arms H may be adjusted in either, according to which circle of cogs are to act upon them.

The cogs, it will be seen, act alternately upon the arms H, the two shafts being connected by the pins $f\,f$, working in contact with each other, and a reciprocating movement being thereby given the bar I, and consequently the sickle J, which is connected to bar I by a connecting-rod.

The springs G serve to equalize the reciprocating movement of the sickle, preventing recoil or reaction, insuring a smooth operation, free from jerks, jars, or concussions which attend the operation of the ordinary reciprocating sickle, to which motion is communicated by a crank. The springs render the movement of the sickle almost as equal and harmonious in its action, free from jars, &c., as a wheel having a continuous rotary movement.

The length of the stroke of the sickle may be varied as desired by adjusting the connecting-rod higher or lower in the bar I, and the speed is varied by adjusting the arms H so as to be acted upon by either cogs $b$ or $b'$. The latter of course will give a slower movement to the sickle than the former.

I would remark that I do not confine myself to the arrangement of the two shafts E E. A single shaft, K, will answer, with the arms $tt$ attached, and having two driving-wheels, L L, working at opposite sides of the shaft K; or one drive-wheel may be employed, with cogs acting alternately upon arms attached to a shaft, N, at opposite sides of the axle of the drive-wheel.

To the under side of the front part of the frame A there is attached, by a hinge or a flexible connection, $u$, a bar, O, having a shoe, P, attached to its outer or disengaged end. This bar O has an arm, Q, projecting at right angles from its back edge, and in said arm a roller, $v$, is placed, which works in a pendent frame, R, attached to the front part of the frame A, said frame passing down through the mortise in the arm Q, in which the roller $v$ is fitted. By this arrangement the bar O is firmly stayed or braced, and at the same time it is allowed to rise and fall freely.

S represents the finger-bar, on which the sickle J works. This finger-bar is attached to the shoe P by means of a joint formed of a cylindrical pin, $w$, which projects at right angles from the inner end of the finger-bar and passes loosely through a bearing, $a^x$, on the shoe. An arm, $b^x$, also projects at right angles from the finger-bar, and has a roller, $c^x$, fitted in it, which roller bears against the front edge of a curved bar, T, one end of which is attached to the shoe and the other end to the bar O, the bar T passing through the mortise in the arm $b^x$. This bar T serves as a stay for the finger-bar. The pin $w$ has a rod, $d^x$, attached to it, and to the outer end of this rod a chain, $e^x$, is connected, said chain passing over a pulley, $f^x$, in the bar O and under a pulley, $g^x$, at the inner end of said bar, and then around a pulley, $h^x$, at the front end of the frame A, and is connected to a lever, U, the lower end of which of is connected to the frame A. To the lever U a lever, V, is attached, having a chain, $i^x$, connected to its front end, said chain being attached directly to the bar O.

From this description it will be seen that the bar O and finger-bar S may both be raised by actuating the lever V, and by actuating the lever U the finger-bar S and sickle J may be raised.

I do not claim broadly the giving of a reciprocating movement to the sickle by means of cogs acting alternately upon arms, for that is an old device and has been previously employed on reapers; but,

Having thus described my invention, what I do claim as new, and desire to secure by Letters Patent, is—

1. The employment or use of a sliding shaft, E, one or two, provided with arms H, in combination with two concentric circles of cogs, $b$ $b'$, attached to the driving-wheel D, or to a wheel connected therewith, for the purpose of varying the speed of the sickle J and throwing the same in and out of gear, substantially as set forth.

2. The employment or use of springs G G, applied to or connected with the shaft or shafts E, in the manner show nor in any equivalent way, for the purpose of equalizing the movement of the sickle or causing it to operate smoothly without jars or concussions, as herein set forth.

3. The curved stay-bar T, attached to the bar O and shoe P, substantially as shown, in combination with the roller $c^x$, connected to the finger-bar S, as shown, and the cylindrical pin $w$, by which the finger-bar is attached to the shoe, all arranged as shown, to admit of the finger-bar and sickle being raised and lowered, and at the same time serve to hold or retain the same in a proper working position.

4. The connecting of the cylindrical pin $w$ to the lever U by means of the chain $e^x$ passing over and around the pulleys $f^x$ $g^x$ in the bar O and around the pulleys $h^x$ on the frame A, and attached to the lever U, for the purpose of raising the finger-bar and sickle, as set forth.

5. Securing the bar O or staying the same in proper position by means of the roller $v$, placed in the arm Q and fitted in the pendent frame R, attached to the frame A, substantially as herein described.

V. W. BLANCHARD.

Witnesses:
SHELDON SMITH,
LUTHER SMITH.